(12) United States Patent
Berme et al.

(10) Patent No.: US 9,927,312 B1
(45) Date of Patent: Mar. 27, 2018

(54) MOTION BASE FOR DISPLACING A FORCE MEASUREMENT ASSEMBLY

(71) Applicant: Bertec Corporation, Columbus, OH (US)

(72) Inventors: Necip Berme, Worthington, OH (US); Benjamin Robert Hoffman, Columbus, OH (US); Sasan Ghassab, Columbus, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

(21) Appl. No.: 15/449,508

(22) Filed: Mar. 3, 2017

(51) Int. Cl.
| | |
|---|---|
| *G01D 7/00* | (2006.01) |
| *G01L 5/16* | (2006.01) |
| *A63B 22/02* | (2006.01) |
| *A63B 71/06* | (2006.01) |
| *G09B 9/00* | (2006.01) |
| *G09B 9/12* | (2006.01) |

(52) U.S. Cl.
CPC ............. *G01L 5/16* (2013.01); *A63B 22/025* (2015.10); *A63B 71/0622* (2013.01); *G09B 9/00* (2013.01); *G09B 9/12* (2013.01)

(58) Field of Classification Search
None
See application file for complete search history.

(56) References Cited

U.S. PATENT DOCUMENTS

| | | | |
|---|---|---|---|
| 6,038,488 A | 3/2000 | Barnes et al. | |
| 6,113,237 A | 9/2000 | Ober et al. | |
| 6,152,564 A | 11/2000 | Ober et al. | |
| 6,295,878 B1 | 10/2001 | Berme | |
| 6,354,155 B1 | 3/2002 | Berme | |
| 6,389,883 B1 | 5/2002 | Berme et al. | |
| 6,774,885 B1 | 8/2004 | Even-Zohar | |
| 6,936,016 B2 | 8/2005 | Berme et al. | |
| 8,181,541 B2 | 5/2012 | Berme | |
| 8,315,822 B2 | 11/2012 | Berme et al. | |
| 8,315,823 B2 | 11/2012 | Berme et al. | |
| D689,388 S | 9/2013 | Berme | |
| D689,389 S | 9/2013 | Berme | |
| 8,543,540 B1 | 9/2013 | Wilson et al. | |
| 8,544,347 B1 | 10/2013 | Berme | |
| 8,643,669 B1 | 2/2014 | Wilson et al. | |
| 8,700,569 B1 | 4/2014 | Wilson et al. | |

(Continued)

*Primary Examiner* — Andre Allen
(74) *Attorney, Agent, or Firm* — The Law Office of Patrick F. O'Reilly III, LLC

(57) ABSTRACT

A motion base for displacing a force measurement assembly is disclosed herein. The motion base includes a base assembly; a support structure configured to be coupled to the force measurement assembly; a rotatable coupling device, the rotatable coupling device rotatably coupling the support structure to the base assembly; and an actuation system, the actuation system including one or more actuators operatively coupled to the support structure, the one or more actuators configured to displace the support structure relative to the base assembly. In one or more embodiments, greater than 50% of the weight of the support structure is supported by the rotatable coupling device. Also, in one or more embodiments, the motion base may be used for displacing objects other than a force measurement assembly, such as for displacing a flight simulator or a virtual reality simulator.

18 Claims, 7 Drawing Sheets

(56) References Cited

U.S. PATENT DOCUMENTS

| | | |
|---|---|---|
| 8,704,855 B1 | 4/2014 | Berme et al. |
| 8,764,532 B1 | 7/2014 | Berme |
| 8,847,989 B1 | 9/2014 | Berme et al. |
| D715,669 S | 10/2014 | Berme |
| 8,902,249 B1 | 12/2014 | Wilson et al. |
| 8,915,149 B1 | 12/2014 | Berme |
| 9,032,817 B2 | 5/2015 | Berme et al. |
| 9,043,278 B1 | 5/2015 | Wilson et al. |
| 9,066,667 B1 | 6/2015 | Berme et al. |
| 9,081,436 B1 | 7/2015 | Berme et al. |
| 9,168,420 B1 | 10/2015 | Berme et al. |
| 9,173,596 B1 | 11/2015 | Berme et al. |
| 9,200,897 B1 | 12/2015 | Wilson et al. |
| 9,277,857 B1 | 3/2016 | Berme et al. |
| D755,067 S | 5/2016 | Berme et al. |
| 9,404,823 B1 | 8/2016 | Berme et al. |
| 9,414,784 B1 | 8/2016 | Berme et al. |
| 9,468,370 B1 | 10/2016 | Shearer |
| 9,517,008 B1 | 12/2016 | Berme et al. |
| 9,526,443 B1 | 12/2016 | Berme et al. |
| 9,526,451 B1 | 12/2016 | Berme |
| 9,568,382 B1 | 2/2017 | Berme et al. |
| 2003/0216656 A1 | 11/2003 | Berme et al. |
| 2008/0228110 A1 | 9/2008 | Berme |
| 2011/0277562 A1 | 11/2011 | Berme |
| 2012/0266648 A1 | 10/2012 | Berme et al. |
| 2012/0271565 A1 | 10/2012 | Berme et al. |
| 2014/0261092 A1* | 9/2014 | Sywak .................. F16M 11/18 108/4 |
| 2014/0318229 A1* | 10/2014 | Tagami ............... G01M 17/007 73/117.01 |
| 2015/0096387 A1 | 4/2015 | Berme et al. |
| 2015/0301459 A1* | 10/2015 | Coon .................. G03F 7/70725 355/67 |
| 2016/0245711 A1 | 8/2016 | Berme et al. |
| 2016/0334288 A1 | 11/2016 | Berme et al. |
| 2017/0076439 A1* | 3/2017 | Wells .................. G06T 7/0004 |

\* cited by examiner

MOTION BASE FOR DISPLACING A FORCE MEASUREMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a motion base for displacing an object mounted thereon. More particularly, the invention relates to a motion base for displacing a force measurement assembly, such as an instrumented treadmill or force plate.

2. Background

Motion bases are used to selectively displace an object mounted thereon. As one example, a force measurement assembly may be mounted on a motion base in order to selectively displace a subject disposed on the force measurement assembly. As another example, a flight simulator may include a motion base that selectively displaces the cockpit of the flight simulator in order to simulate the flying of an aircraft. Conventional motion bases comprise a top plate or frame supported on a plurality of actuators. The object displaced by the motion base is mounted to the top plate or frame. The plurality of actuators selectively displaces the top plate or frame of the motion base, and the object mounted thereon, based upon input control signals sent to the actuators.

However, these conventional motion bases have numerous limitations and drawbacks. First of all, because the entire weight of the top plate or frame of the motion base is supported by the plurality of actuators, the individual actuators are required to be structurally robust (i.e., heavy-duty actuators are required to support the entire weight of the top plate or frame of the motion base and the object attached thereto). Secondly, many conventional motion bases tend to have a natural frequency that is lower than that desired for applications that use the motion bases to displace force measurement assemblies. A motion base with a low natural frequency can deleteriously produce force measurement errors in the output signal of the force measurement assembly supported thereby. Finally, because the entire weight of the top plate or frame of the motion base is supported by the plurality of actuators in a conventional motion base, four to six actuators are typically required to support the weight of the top plate or frame of the motion base and the object supported thereon, which results in a relatively complex actuator control system and substantial actuator power requirements.

What is needed, therefore, is a motion base that obviates the need for supporting the entire weight of the object being displaced on the actuators of the motion base. Moreover, a motion base is needed that has a high natural frequency so that forces and/or moments are capable of being accurately measured by a force measurement assembly displaced by the motion base. Furthermore, a motion base also is needed that is capable of being operated by a simpler control system as compared to conventional motion bases. In addition, a motion base is needed that has lower operating power requirements than a conventional motion base.

BRIEF SUMMARY OF EMBODIMENTS OF THE INVENTION

Accordingly, the present invention is directed to a motion base for displacing a force measurement assembly that substantially obviates one or more problems resulting from the limitations and deficiencies of the related art.

In accordance with one or more embodiments of the present invention, there is provided a motion base for displacing a force measurement assembly. The motion base includes a base assembly; a support structure configured to be coupled to the force measurement assembly; a rotatable coupling device, the rotatable coupling device rotatably coupling the support structure to the base assembly; and an actuation system, the actuation system including one or more actuators operatively coupled to the support structure, the one or more actuators configured to displace the support structure relative to the base assembly.

In a further embodiment of the present invention, the motion base has at least two degrees of freedom.

In yet a further embodiment, the weight of the support structure is not entirely supported by the one or more actuators.

In still a further embodiment, greater than 50% of the weight of the support structure is supported by the rotatable coupling device.

In yet a further embodiment, the rotatable coupling device has at least two degrees of freedom.

In still a further embodiment, the rotatable coupling device comprises a gimbal component.

In yet a further embodiment, the one or more actuators of the actuation system comprise one or more linear actuators and the base assembly comprises a base component for supporting the motion base, the one or more linear actuators of the actuation system being connected between the base component and the support structure.

In still a further embodiment, the one or more linear actuators of the actuation system comprise a plurality of linear actuators, each of the plurality of linear actuators connected between the base component and the support structure.

In yet a further embodiment, the base assembly further comprises a mounting frame for supporting the rotatable coupling device above the base component.

In still a further embodiment, the motion base further comprises one or more bearing assemblies for rotatably coupling the rotatable coupling device to the mounting frame of the base assembly.

In yet a further embodiment, an upper end of at least one of the one or more linear actuators of the actuation system is rotatably connected to the support structure by means of an upper joint member having at least two degrees of freedom.

In still a further embodiment, a lower end of at least one of the one or more linear actuators of the actuation system is rotatably connected to the base component by means of a lower joint member having at least two degrees of freedom.

In yet a further embodiment, the force measurement assembly comprises one of: (i) an instrumented treadmill and (ii) a force plate.

In accordance with one or more other embodiments of the present invention, there is provided a motion base for displacing an object above a support surface. The motion base includes a base assembly; a support structure configured to be coupled to the object; a rotatable coupling device, the rotatable coupling device rotatably coupling the support structure to the base assembly; and an actuation system, the actuation system including one or more actuators operatively coupled to the support structure, the one or more actuators configured to displace the support structure relative to the base assembly.

In a further embodiment of the present invention, the object that is coupled to the support structure comprises one of: (i) an instrumented treadmill, (ii) a force plate, (iii) a flight simulator, and (iv) a virtual reality simulator.

In accordance with yet one or more other embodiments of the present invention, there is provided a motion base for displacing a force measurement assembly. The motion base includes a base assembly; a support structure configured to be coupled to the force measurement assembly; a rotatable coupling device, the rotatable coupling device rotatably coupling the support structure to the base assembly; and an actuation system, the actuation system including one or more actuators operatively coupled to the support structure, the one or more actuators configured to displace the support structure relative to the base assembly. In these one or more embodiments, greater than 50% of the weight of the support structure is supported by the rotatable coupling device.

In a further embodiment of the present invention, the rotatable coupling device has at least two degrees of freedom.

In yet a further embodiment, the one or more actuators of the actuation system comprise one or more linear actuators and the base assembly comprises a base component for supporting the motion base, the one or more linear actuators of the actuation system being connected between the base component and the support structure.

In still a further embodiment, the one or more linear actuators of the actuation system comprise a plurality of linear actuators, each of the plurality of linear actuators connected between the base component and the support structure.

In yet a further embodiment, the base assembly further comprises a mounting frame for supporting the rotatable coupling device above the base component.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 5:
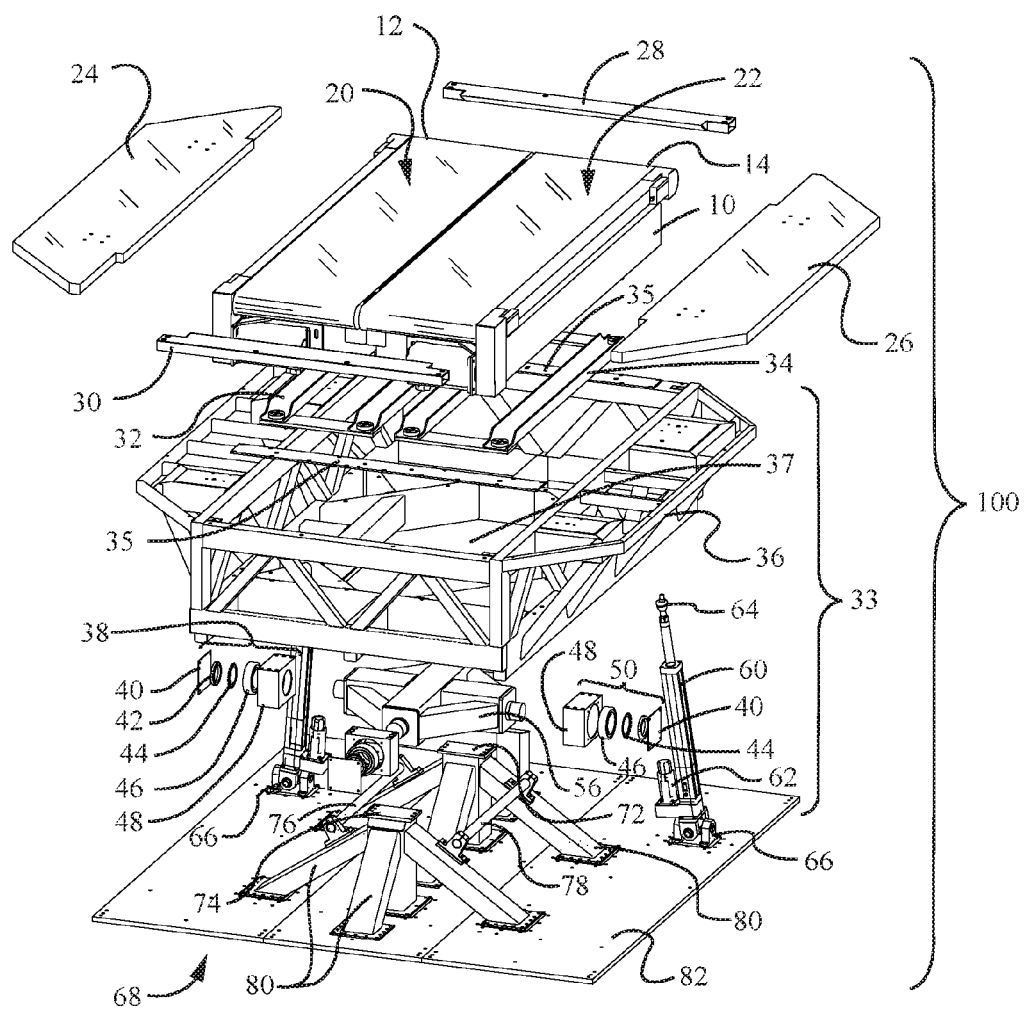
FIG. 5 is a rear-side exploded perspective view of the force measurement system of FIG. 1.
Figure 6:
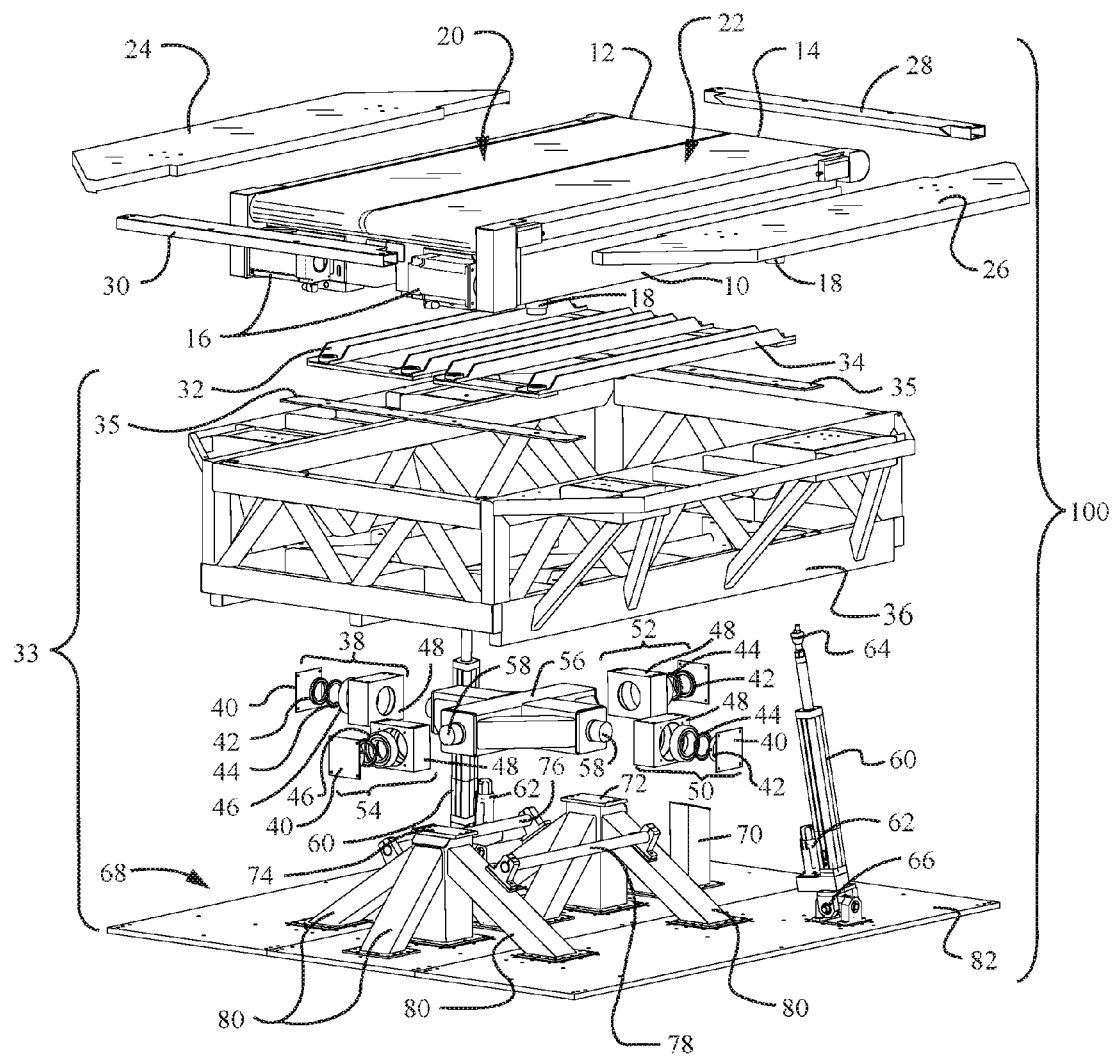
FIG. 6 is another rear-side exploded perspective view of the force measurement system of FIG. 1.

An illustrative embodiment of a force measurement system is seen generally at 100 in FIGS. 1-3, 5, and 6. The illustrative embodiment of the force measurement system 100 generally comprises a force measurement assembly in the form of an instrumented treadmill 10 supported on a motion base 33. The instrumented treadmill 10 is configured to receive a subject thereon. As best illustrated in FIGS. 5 and 6, the instrumented treadmill 10 is attached to a pair of damping frame subassemblies 32, 34 which, in turn, are attached to damping frame mounting bars 35. The damping frame mounting bars 35 are attached to the treadmill support structure 36. The instrumented treadmill 10 has a plurality of top surfaces (i.e., left and right rotating belts 12, 14) that are each configured to receive a portion of a body of a subject (e.g., the left belt 12 of the instrumented treadmill 10 is configured to receive a left leg of a subject, whereas the right belt 14 of the instrumented treadmill 10 is configured to receive a right leg of the subject).

In one or more embodiments, a subject walks or runs in an upright position atop the treadmill 10 with the feet of the subject contacting the respective top surfaces 20, 22 of the treadmill belts 12, 14. The belts 12, 14 of the treadmill 10 are rotated by independent electric actuator assemblies with speed adjustment mechanisms 16 (see FIG. 6). In the illustrated embodiment, each electric actuator assembly and associated speed adjustment mechanism 16 comprises an electric motor with a variable speed control device operatively coupled thereto. Each electric actuator assembly and associated speed adjustment mechanism 16 is capable of rotating its respective treadmill belt 12, 14 at a plurality of different speeds. The speed adjustment mechanisms adjust the speed at which each of their respective treadmill belts 12, 14 are rotated. The instrumented treadmill 10 is operatively connected to a data acquisition/data processing device 90 (i.e., an operator computing device 90—see FIG. 7) by an electrical cable. While they are not readily visible in the top perspective view of FIG. 1 due to their location, the instrumented treadmill 10 includes a plurality of force transducers (e.g., four (4) pylon-type force transducers 18—see FIGS. 2, 3, and 6) disposed below each rotating belt 12, 14 of the treadmill 10 so that the loads being applied to the top surfaces of the belts 12, 14 can be measured. Advantageously, the separated belts 12, 14 of the instrumented treadmill 10 enable the forces and/or moments applied by the left and right legs of the subject to be independently determined.

Figure 2:
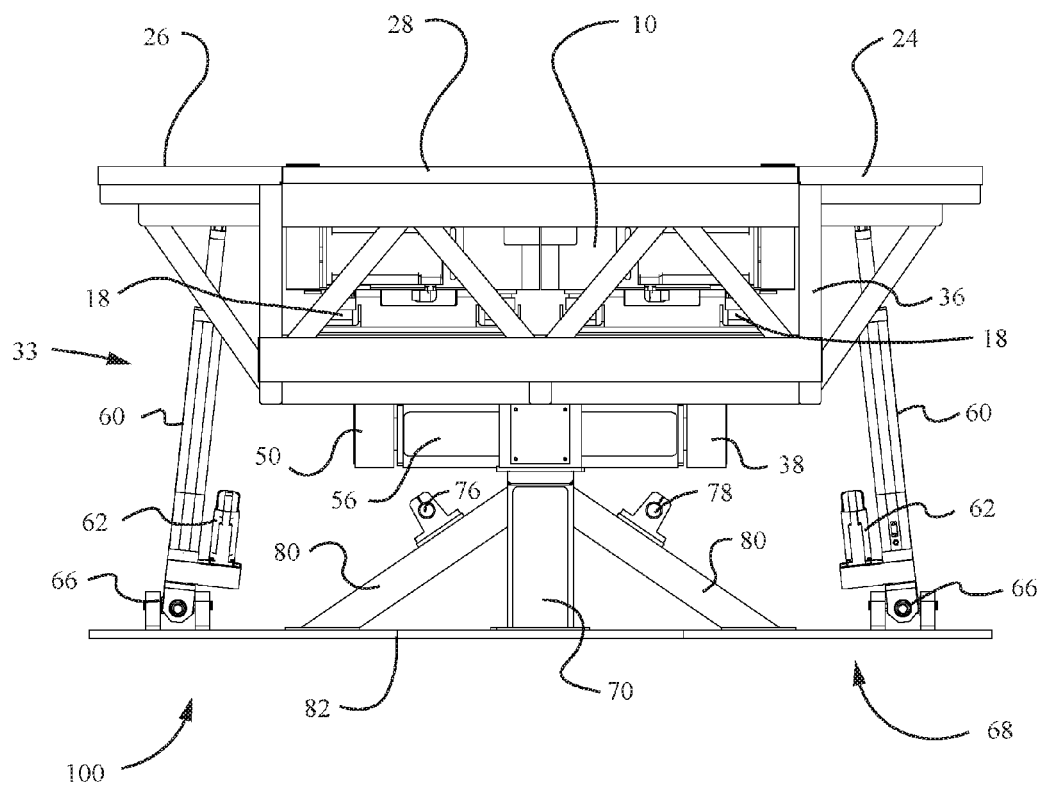
FIG. 2 is a front end view of the force measurement system with the motion base of FIG. 1.
Figure 3:
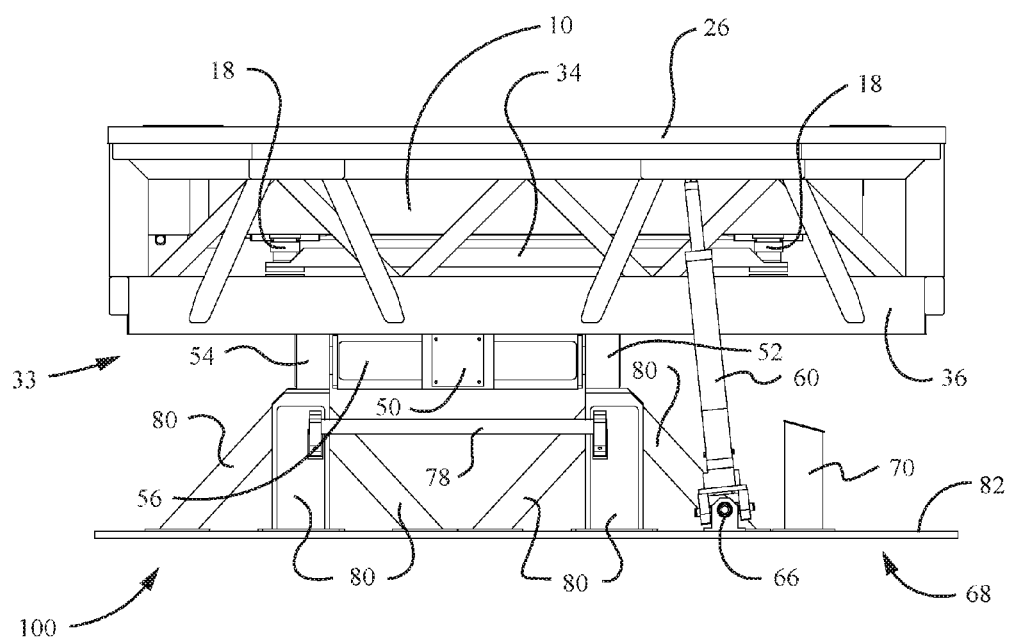
FIG. 3 is a side view of the force measurement system with the motion base of FIG. 1.

As mentioned above, each of the treadmill belts 12, 14 is supported atop four (4) pylon-type force transducers 18 (or pylon-type load cells) that are disposed underneath, and near each of the four corners (4) of the left rotating belt 12 of the treadmill 10 and each of the four corners (4) of the right rotating belt 14 (see FIGS. 2, 3, and 6). Each of the eight (8) illustrated pylon-type force transducers 18 has a plurality of strain gages adhered to the outer periphery of a cylindrically-shaped force transducer sensing element for detecting the mechanical strain of the force transducer sensing element imparted thereon by the force(s) applied to the belt surfaces 20, 22 of the instrumented treadmill 10. In FIGS. 3, 5, and 6, it can be seen that each of the sets of four (4) pylon-type force transducers 18 are mounted atop respective damping frame subassemblies 32, 34 so as to prevent building vibrations and other external vibrations from adversely affecting the measurement accuracy of the pylon-type force transducers 18. Also, as shown in the exploded views of FIGS. 5 and 6, a pair of damping frame mounting bars 35 is provided underneath the damping frame subassemblies 32, 34 for attaching the instrumented treadmill 10 to the motion base main frame structure 36.

In an alternative embodiment, rather than using four (4) pylon-type force transducers 18 on each treadmill belt assembly 12, 14, force transducers in the form of transducer beams could be provided under each treadmill belt assembly 12, 14. In this alternative embodiment, the left treadmill belt assembly 12 could comprise two transducer beams that are disposed underneath, and on generally opposite sides of the treadmill belt assembly 12. Similarly, in this embodiment, the right treadmill belt assembly 14 could comprise two transducer beams that are disposed underneath, and on generally opposite sides of the right treadmill belt assembly 14. Similar to the pylon-type force transducers 18, the force transducer beams could have a plurality of strain gages attached to one or more surfaces thereof for sensing the mechanical strain imparted on the beam by the force(s) applied to the surfaces 20, 22 of the instrumented treadmill 10.

Rather, than using four (4) force transducer pylons under each treadmill belt assembly 12, 14, or two spaced apart force transducer beams under each treadmill belt assembly 12, 14, it is to be understood that the instrumented treadmill 10 can also utilize the force transducer technology described in U.S. Pat. No. 8,544,347, the entire disclosure of which is incorporated herein by reference.

Now, referring to FIGS. 1-6, the features of the illustrative motion base 33 will be described in detail. In the illustrative embodiment, the motion base 33 generally comprises a base assembly 68; a support structure or main frame 36 coupled to the instrumented treadmill 10; a rotatable coupling device 56, the rotatable coupling device 56 rotatably coupling the main frame 36 to the base assembly 68; and an actuation system 60, 62, the actuation system including one or more actuators 60 operatively coupled to the main frame 36, the one or more actuators 60 configured to displace the main frame 36 relative to the base assembly 68. In the illustrative embodiment, the motion base 33 has two degrees of freedom (e.g., the motion base 33 is capable of being rotated in the pitch and roll directions). Although, in alternative embodiments, the motion base 33 may comprise more than two degrees of freedom. Also, in the illustrative embodiment, greater than 50% of the weight of the motion base main frame 36 and the instrumented treadmill 10 mounted thereon is supported by the rotatable coupling device 56 (e.g., in an exemplary embodiment, approximately 80% of the weight of the motion base main frame 36 and the instrumented treadmill 10 mounted thereon is supported by the rotatable coupling device 56). As such, the weight of the motion base main frame 36 and the instrumented treadmill 10 mounted thereon is not entirely supported by the actuators 60. Therefore, because the actuators 60 are not required to support the entire weight of the motion base main frame 36 and the instrumented treadmill 10, a smaller quantity of actuators 60 is able to be used for the motion base 33, and the cross-sectional size of each of the actuators 60 is able to be significantly reduced.

Now, with particular reference to FIGS. 1 and 4-6, the base assembly 68 of the motion base 33 will be described in detail. As shown in these figures, the base assembly 68 generally comprises a plurality of support posts 72, 74 for supporting the rotatable coupling device 56 thereon, a plurality of safety stop mechanisms 70, 76, 78 for preventing the main frame 36 of the motion base 33 from exceeding a predetermined angular displacement in the pitch and roll directions, and a base plate 82 on which the components 70, 72, 74, 76, 78 of the base assembly 68 are supported. In particular, the base assembly 68 comprises a front support post 72 and a rear support post 74, which is spaced apart from the front support post 72 by a distance substantially equal to the length of the rotatable coupling device 56 (see FIGS. 4 and 6). As best illustrated in the exploded views of FIGS. 5 and 6, each of the vertical support posts 72, 74 is provided with a plurality of diagonal bracing members 80 disposed therearound for adding lateral structural rigidity to the support posts 72, 74. In the illustrated embodiment, it can be seen that each of the support posts 72, 74 is provided with four (4) diagonal bracing members 80 spaced 90 degrees apart from one another about the circumference of each support post 72, 74. In the illustrative embodiment, the upper end of each diagonal bracing member 80 is secured to one of the four sides of a respective support post 72, 74, and the lower end of each diagonal bracing member 80 is secured to the top surface of the base plate 82 of the base assembly 68 (see FIGS. 4-6). Together, the vertical support posts 72, 74 and their associated diagonal bracing members 80 form the mounting frame of the rotatable coupling device 56.

Figure 4:
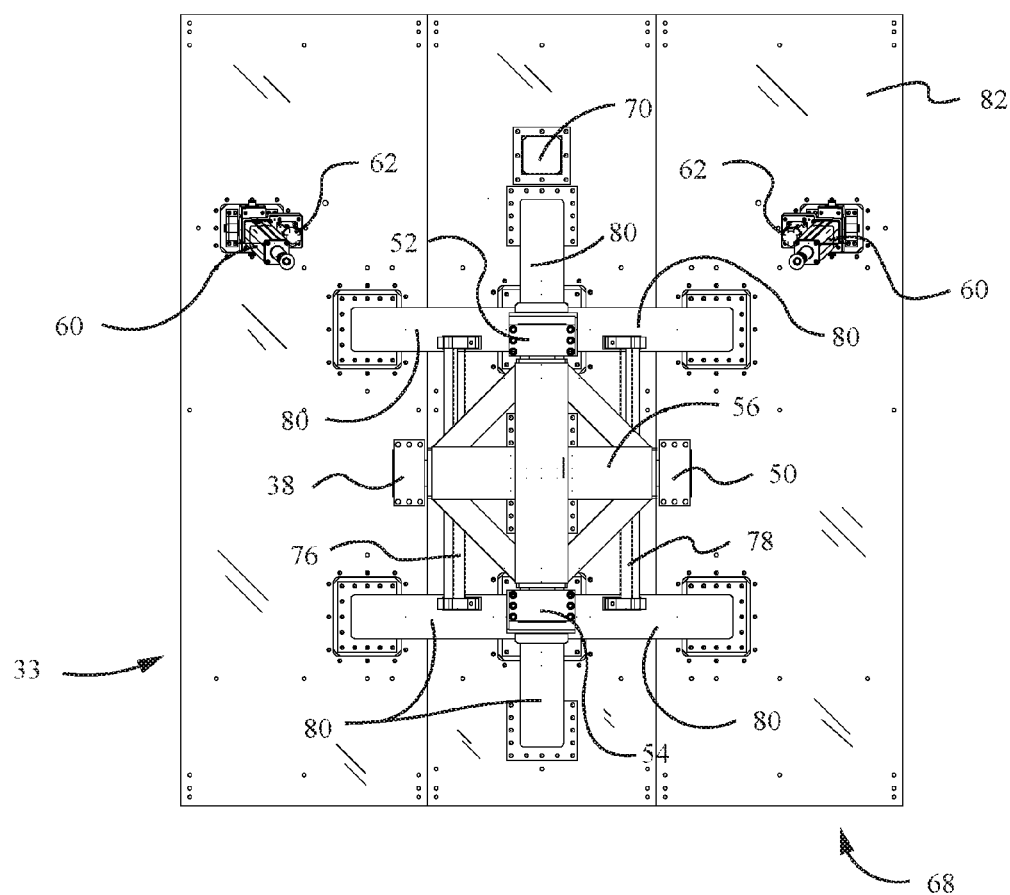
FIG. 4 is a top plan view of the motion base of the force measurement system of FIG. 1.

With combined reference to FIGS. 4-6, it can be seen that the safety stop mechanisms 70, 76, 78 of the base assembly 68 include a front stop post 70, a first safety stop bar 76, and a second safety stop bar 78. The front stop post 70 limits the rotation of the main frame 36 and instrumented treadmill 10 mounted thereon to a maximum decline pitch displacement of approximately 15 degrees in the event that one or more of the actuators 60 would fail. The first and second safety stop bars 76, 78 limit the rotation of the main frame 36 and instrumented treadmill 10 mounted thereon to a maximum roll displacement of approximately ±15 degrees in the event that one or more of the actuators 60 would fail. In one or more embodiments, a rubber pad may be provided on the top of the front stop post 70 to act as a bumper to absorb the impact of the main frame 36 striking the top of the front stop post 70 if the one or more of the actuators 60 were to fail. Similarly, in one or more embodiments, rubber sleeves may be provided on at least longitudinal portions of the first and second safety stop bars 76, 78 to act as bumpers to absorb the impact of the main frame 36 striking the safety stop bars 76, 78 if the one or more of the actuators 60 were to fail.

Next, referring primarily to FIGS. 4-6, the rotatable coupling device 56 of the motion base 33 will be explained in detail. As shown in these figures, in the illustrative embodiment, the rotatable coupling device 56 comprises a gimbal component (i.e., a main gimbal weldment). The gimbal component 56 has two degrees of freedom in the illustrative embodiment (i.e., the gimbal component 56 is able to rotate about the x-axis in the pitch direction, and the gimbal component 56 is able to rotate about the y-axis in the roll direction). As such, the gimbal component 56 results in the overall two degrees of freedom of the motion base 33. Referring to FIG. 6, it can be seen that the gimbal component 56 comprises a generally diamond-shaped main body portion with four (4) cylindrical protrusions in the form of stub shafts 58 extending outwardly from the main body portion. In the illustrated embodiment, the main body portion of the gimbal component 56 is formed by intersecting straight members and diagonal bracing members extending between the intersecting straight members and being disposed at approximately 45 degree angles relative to the straight members. Also, in the illustrated embodiment, it can be seen that the stub shafts 58 are spaced 90 degrees apart from one another about the circumference of the main body portion of the gimbal component 56. As will be described in detail hereinafter, each of the stub shafts 58 is received within a respective bearing assembly 38, 50, 52, 54, and is provided with a threaded distal end portion for threadingly engaging with a lock nut member 42. As best shown in the top view of FIG. 4, the gimbal component 56 is rotatably attached to the base assembly 68 of the motion base 33 by means of a front bearing assembly 52 and a rear bearing assembly 54. The bearing assemblies 52, 54 allow the gimbal component 56 to rotate about the y-axis relative to the base assembly 68 in a roll direction. The other pair of bearing assemblies 38, 50 rotatably couple the gimbal component 56 to the underside of the main frame 36 of the motion base 33. The bearing assemblies 38, 50 allow the main frame 36 of the motion base 33 to rotate about the x-axis relative to the gimbal component 56 in a pitch direction. Together the bearing assemblies 38, 50, 52, 54 enable the overall two degrees of freedom of the motion base 33.

With reference to the exploded views of FIGS. 5 and 6, the constituent components of the bearing assemblies 38, 50, 52, 54 will be described. As shown in these figures, each bearing assembly 38, 50, 52, 54 comprises a bearing housing cover plate 40, a lock nut member 42, a lock washer member 44, a bearing member 46, and a main bearing housing member 48. The lock nut member 42, the lock washer member 44, the bearing member 46 are housed within the bearing housing components 40, 48. Specifically, the lock nut member 42, the lock washer member 44, the bearing member 46 are received within the cylindrical recess of the main bearing housing member 48, and the cover plate 42 encloses the side of the bearing housing member 48 that is opposite to the side through which a respective one of the stub shafts 58 extends. The bearing member 46 allows the stub shaft 58 of the gimbal component 56 to rotate relative to its respective bearing assembly 38, 50, 52, 54 with minimal friction. The lock nut member 42 threadingly engages a threaded distal end portion of a respective one of the stub shafts 58 so as to securely couple the gimbal component 56 to each of the bearing assemblies 38, 50, 52, 54 in a rotatable manner. The lock washer member 44 of each bearing assembly 38, 50, 52, 54 prevents the lock nut member 42 from becoming inadvertently disengaged from its respective stub shaft 58 of the gimbal component 56 (i.e., the lock washer member 44 prevents the lock nut member 42 from loosening over time). When the cover plate 42 is disposed on the bearing housing member 48, the components 42, 44, 46 are enclosed within the bearing housing components 40, 48.

Referring again to FIGS. 1, 5, and 6, the motion base main frame structure 36, which supports the instrumented treadmill 10 thereon will be described. As shown in these figures, the motion base main frame structure 36 is formed from a plurality frame members welded together to form a composite frame. Diagonal cross-bracing members are provided throughout the motion base main frame structure 36 in order to reinforce the frame structure 36 and increase its structural rigidity. The top portion of the frame structure 36 comprises a central recess formed therein for receiving the instrumented treadmill 10. The frame structure 36 further comprises two cantilevered side portions disposed on opposite lateral sides of the instrumented treadmill 10 for supporting walking deck plate members 24, 26 (see FIGS. 1 and 5). Together with the belt surfaces 20, 22 of the instrumented treadmill 10, the walking deck plate members 24, 26 form the measurement surface platform. Because the instrumented treadmill 10 is recess-mounted within the central recess in the frame structure 36, the belt surfaces 20, 22 of the instrumented treadmill 10 lie generally flush with the walking deck plate members 24, 26. Turning again to FIGS. 1, 5, and 6, it can be seen that the treadmill belt end covers 28, 30 are provided on the respective front and rear sides of the treadmill belts 12, 14 of the instrumented treadmill 10. The treadmill belt end covers 28, 30 prevent the feet of the subject from becoming inadvertently caught in the gap between the treadmill belt 12, 14 and the frame structure 36. Also, as shown in FIG. 5, it can be seen that the bottom portion of the frame structure 36 is provided with a gimbal opening 37 formed therein for allowing the gimbal component 56 to pass through the gimbal opening 37 as the frame structure 36 of the motion base 33 is displaced. Advantageously, because the gimbal component 56 is able to pass through the gimbal opening 37 as the frame structure 36 is displaced, the overall height of the motion base 33 is able to be substantially reduced, thereby making it easier for the subject to get on and off the instrumented treadmill 10.

Figure 1:
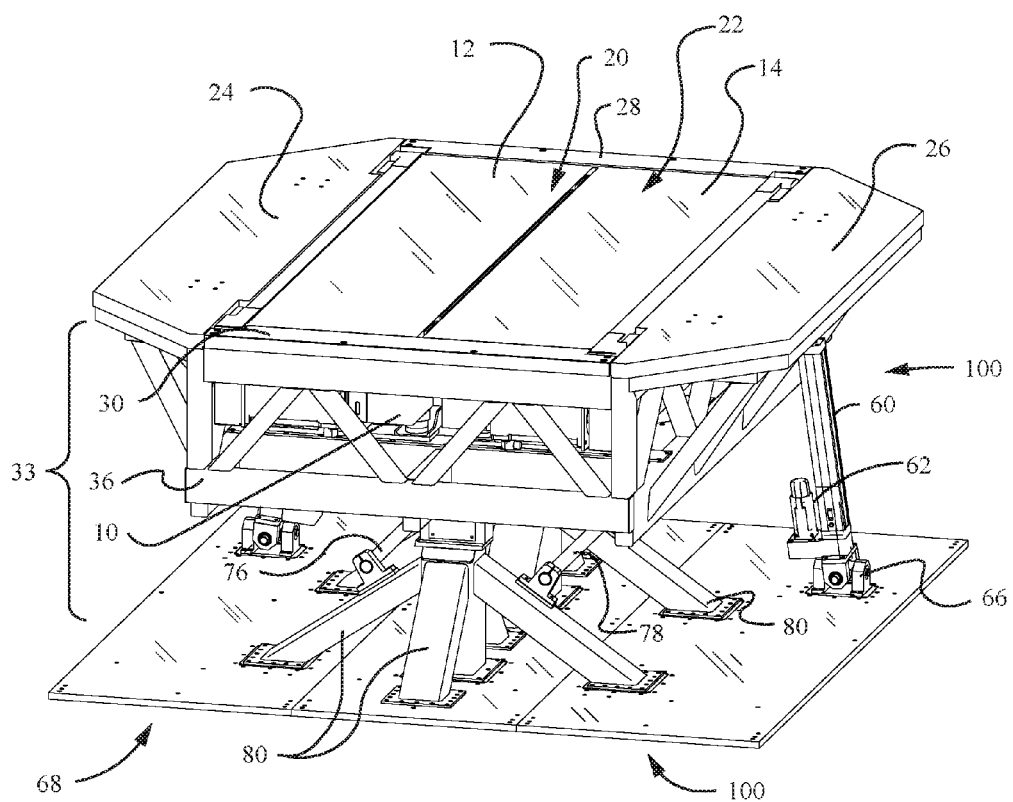
FIG. 1 is a top perspective view of a force measurement system with a force measurement assembly in the form of an instrumented treadmill supported on a motion base, according to an embodiment of the invention.

Next, with reference to FIGS. 1-3, 5, and 6, the actuation system of the motion base 33 will be described in detail. As shown in these figures, in the illustrative embodiment, the actuation system of the motion base 33 generally comprises a pair of linear actuators 60 configured to displace the motion base main frame structure 36 and the instrumented treadmill 10 supported thereon relative to the base assembly 68. In FIGS. 1-3, it can be seen that each of the linear actuators 60 is connected between the base plate 82 of the base assembly 68 and the frame structure 36. In the illustrated embodiment, each of the linear actuators 60 is in the form of an electric cylinder, which is powered by an electric servo motor 62 (see FIGS. 1, 2, 5, and 6). However, in alternative embodiments, other types of linear actuators may be used in lieu of electric cylinders, such as hydraulic actuators or pneumatic actuators. Turning again to FIGS. 5 and 6, it can be seen that the upper end of each linear actuator 60 of the actuation system is rotatably connected to the frame structure 36 by means of an upper joint member having three rotational degrees of freedom. In the illustrative embodiment, the upper joint member rotatably coupling each linear actuator 60 to the frame structure 36 comprises an inline ball joint 64 or spherical joint 64 providing the three rotational degrees of freedom. Also, as best shown in FIGS. 5 and 6, it can be seen that the lower end of each linear actuator 60 of the actuation system is rotatably connected to the base plate 82 of the base assembly 68 by means of a lower joint member 66 having two degrees of freedom. In the illustrative embodiment, the lower joint member 66 rotatably coupling each linear actuator 60 to the base plate 82 of the base assembly 68 comprises a gimbal joint 66 (i.e., gimbal weldment joint 66) providing the two rotational degrees of freedom. The gimbal joint 66 comprises a gimbal component similar to the main gimbal weldment 56, except that the gimbal component of the gimbal joint 66 is substantially smaller than the gimbal component 56, and it is monolithically formed, rather than being formed from a plurality of separate members welded to one another.

In the illustrative embodiment, the pair of linear actuators 60 of the motion base actuation system rotate the motion base main frame structure 36 in both the pitch and roll directions so as to result in the two degrees of freedom provided by the motion base 33. In the illustrative embodiment, the linear actuators 60 are capable of displacing the motion base frame structure 36 such that the motion base 33 is capable of approximately a 15 degree pitch incline and a 10 degree pitch decline (i.e., the motion base 33 has a range of motion in the pitch direction between approximately −10 degrees and approximately +15 degrees). Also, in the illustrative embodiment, the linear actuators 60 are capable of displacing the motion base frame structure 36 such that the motion base 33 is capable of a range of motion of ±10 degrees in the roll direction (i.e., 10 degrees to either side in the roll direction). The linear actuators 60 of the illustrative embodiment also are capable of displacing the motion base frame structure 36 such that the motion base 33 is capable of compound angular displacements of the frame structure 36 (e.g., 12 degrees in the pitch direction and 8 degrees in the roll direction).

Figure 7:
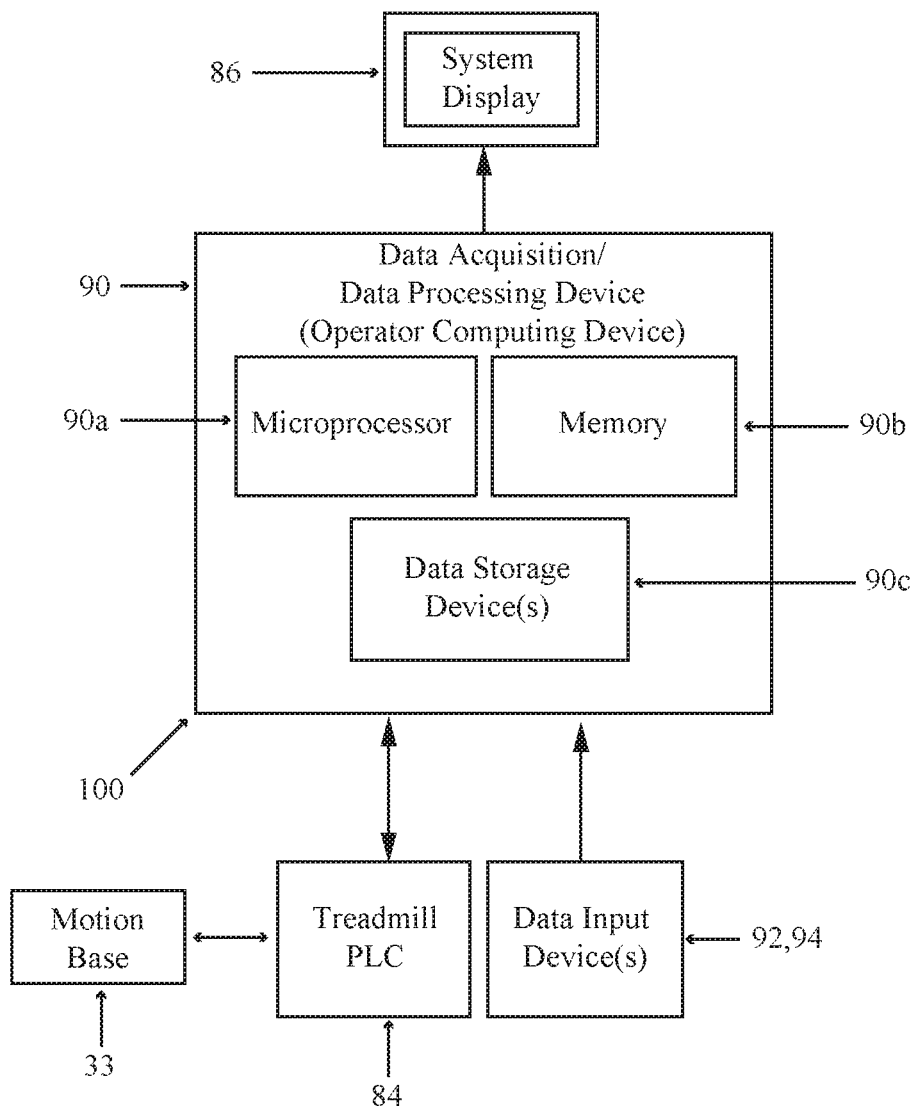
FIG. 7 is a block diagram of constituent components of the force measurement system of FIG. 1, according to the embodiment of the invention.

Now, turning to FIG. 7, it can be seen that the illustrated data acquisition/data processing device 90 (i.e., the operator computing device) of the force measurement system 100 includes a microprocessor 90a for processing data, memory 90b (e.g., random access memory or RAM) for storing data during the processing thereof, and data storage device(s) 90c, such as one or more hard drives, compact disk drives, floppy disk drives, flash drives, or any combination thereof. As shown in FIG. 7, the programmable logic controller (PLC) 84 of the instrumented treadmill 10, and the system visual display device 86 are operatively coupled to the data acquisition/data processing device 90 such that data is capable of being transferred between these devices 84, 86, and 90. Also, as illustrated in FIG. 7, a plurality of data input devices 92, 94, such as a keyboard and mouse, are diagrammatically shown in FIG. 7 as being operatively coupled to the data acquisition/data processing device 90 so that a user is able to enter data into the data acquisition/data processing device 90. In some embodiments, the data acquisition/data processing device 90 can be in the form of a desktop computer, while in other embodiments, the data acquisition/data processing device 90 can be embodied as a laptop computer.

Advantageously, the treadmill programmable logic controller 84 (see e.g., FIG. 7, which is a type of data processing device) provides real-time control of the treadmill actuators (i.e., motors) that control the rotation of the left and right treadmill belts 12, 14. The real-time control provided by the programmable logic controller 84 ensures that the software regulating the control of the left and right treadmill belts 12, 14 operates at the design clock rate, thereby providing fail-safe operation for subject safety. In one embodiment, the programmable logic controller 84 comprises both the treadmill control software and the input/output management software, which controls the functionality of the input/output (I/O) module of the programmable logic controller 84. In one embodiment, the programmable logic controller 84 utilizes EtherCAT protocol for enhanced speed capabilities and real-time control.

In the illustrative embodiment, as shown in FIG. 7, the treadmill programmable logic controller 84 is also operatively coupled to the motion base 33 in a bidirectional data flow manner so as to allow data to be transferred in both directions between the motion base 33 and the programmable logic controller (PLC) 84. For example, motion base control signals are sent from the programmable logic controller (PLC) 84 to the motion base 33, and feedback data in the form of motion base position, velocity, and acceleration is sent from the motion base 33 to the programmable logic controller (PLC) 84. The motion base control signals control the pitch and roll rotational displacement of the motion base 33.

In one or more embodiments, one or more emergency stop switches may be operatively coupled to the programmable logic controller 84 in order to quasi-instantaneously stop the rotation of the treadmill belts 12, 14 and/or the motion base 33. As such, the one or more emergency stop switches are safety mechanisms that protect a subject disposed on the instrumented treadmill 10 from potential injury. In an exemplary embodiment, the one or more emergency stop switches may be in the form of one or more red pushbuttons that can be easily pressed by a user of the force measurement system 100 in order to stop the rotation of the treadmill belts 12, 14 and/or the displacement of the motion base 33.

Now, the acquisition and processing of the load data carried out by the force measurement system will be described. Initially, a load is applied to the instrumented treadmill 10 by a subject disposed thereon. The load is transmitted from the treadmill belt assemblies 12, 14 to its respective set of pylon-type force transducers 18 (or force transducer beams). As described above, in the illustrated embodiment, each treadmill belt assembly 12, 14 comprises four (4) pylon-type force transducers 18 disposed thereunder. Preferably, these pylon-type force transducers 18 are disposed near respective corners of each treadmill belt assembly 12, 14. In a preferred embodiment, each of the pylon-type force transducers 18 includes a plurality of strain gages wired in one or more Wheatstone bridge configurations, wherein the electrical resistance of each strain gage is altered when the associated portion of the associated pylon-type force transducer undergoes deformation resulting from the load (i.e., forces and/or moments) acting on the treadmill belt assemblies 12, 14. For each plurality of strain gages disposed on the pylon-type force transducers 18, the change in the electrical resistance of the strain gages brings about a consequential change in the output voltage of the Wheatstone bridge (i.e., a quantity representative of the load being applied to the measurement surface). Thus, in one embodiment, the four (4) pylon-type force transducers 18 disposed under each treadmill belt assembly 12, 14 output a total of thirty-two (32) raw output voltages (signals) in either analog or digital form. In some embodiments, if the output voltages (signals) are in analog form, the thirty-two (32) raw output voltages (signals) from each treadmill belt assembly 12, 14 are then transmitted to a preamplifier board for preconditioning. The preamplifier board is used to increase the magnitudes of the transducer analog voltages. After which, in one or more embodiments, the analog output signals $S_{APO1}$-$S_{APO32}$ are transmitted from the analog preamplifier to the treadmill programmable logic controller (PLC) 84. In the treadmill programmable logic controller 84, the analog output signals $S_{APO1}$-$S_{APO32}$ are converted into forces, moments, centers of pressure (COP), subject center of gravity (COG), and/or sway angle for the subject. Then, the forces, moments, centers of pressure (COP), subject center of gravity (COG), and/or sway angle for the subject computed by the programmable logic controller 84 are transmitted to the data acquisition/data processing device 90 (operator computing device 90) so that they can be utilized for analyzing the movement of the subject and/or for reports displayed to an operator or clinician. Also, in yet another embodiment, the preamplifier board additionally could be used to convert the analog voltage signals into digital voltage signals (i.e., the preamplifier board could be provided with an analog-to-digital converter). In this embodiment, digital voltage signals would be transmitted to the treadmill programmable logic controller 84 rather than analog voltage signals.

In one or more embodiments, when the programmable logic controller 84 receives the voltage signals $S_{ACO1}$-$S_{ACO32}$, it initially transforms the signals into output forces and/or moments by multiplying the voltage signals $S_{ACO1}$-$S_{ACO32}$ by a calibration matrix. After which, the force and moment components (i.e., $F_{Lx}$, $F_{Ly}$, $F_{Lz}$, $M_{Lx}$, $M_{Ly}$, $M_{Lz}$) exerted on the left belt surface 20 of the left treadmill belt assembly 12 by the left foot of the subject, the force and moment components (i.e., $F_{Rx}$, $F_{Ry}$, $F_{Rz}$, $M_{Rx}$, $M_{Ry}$, $M_{Rz}$) exerted on the right belt surface 22 of the right treadmill belt assembly 14 by the right foot of the subject, and the center of pressure ($x_{P_L}$, $y_{P_L}$; $x_{P_R}$, $y_{P_R}$) for each foot of the subject (i.e., the x and y coordinates of the point of application of the force applied to the measurement surface by each foot) are determined by the programmable logic controller 84, and then transmitted to the data acquisition/data processing device 90.

In the illustrative embodiment, when the motion base 33 is provided as part of the force measurement system 100, the motion base 33 may displace the instrumented treadmill 10 disposed thereon in accordance with a scene being displayed on the system visual display device 86. For example, if an inclined ground surface is being displayed in the scene on the system visual display device 86, then the instrumented treadmill 10 may be tilted by the motion base 33 so that it assumes an inclined position corresponding to the inclined ground surface in the scene. As another example, if a collision occurs in the scene (i.e., walking into a wall, etc.), then the motion base 33 may respond to the scene collision and/or the belt speed of the instrumented treadmill 10 may be reduced to zero in response to the scene collision.

While an instrumented treadmill 10 is attached to the motion base main frame structure 36 of the motion base 33 in the illustrative embodiment, it is to be understood that, in alternative embodiments of the invention, other objects may be attached to the motion base main frame structure 36 in lieu of the instrumented treadmill 10. For example, other force measurement assemblies, such as force plates, may be attached to the motion base main frame structure 36. Also, objects other force measurement assemblies, such as flight simulators and virtual reality simulators, may also be attached to the motion base main frame structure 36 of the motion base 33. As such, the motion base 33 may be used for displacing a myriad of different objects attached to the motion base main frame structure 36 thereof.

It is readily apparent from the above detailed description that the aforedescribed motion base 33 offers numerous advantages. First of all, the motion base 33 described above obviates the need for supporting the entire weight of the object being displaced on the actuators of the motion base. That is, the rotatable coupling device 56 of the motion base 33 enhances the overall stiffness of the motion base 33, and obviates the need for the entire stiffness of the motion base 33 to depend on the actuators. Moreover, the aforedescribed motion base 33 has a high natural frequency so that forces and/or moments are capable of being accurately measured by the force measurement assembly 10 (i.e., the instrumented treadmill 10) displaced by the motion base 33. Supporting a majority of the weight of the motion base main frame 36 and the instrumented treadmill 10 on the rotatable coupling device 56 advantageously allows the motion base 33 to have a high natural frequency. Furthermore, the motion base 33 described above also is capable of being operated by a simpler control system as compared to conventional motion bases. In addition, the aforedescribed motion base 33 has lower operating power requirements than a conventional motion base because fewer actuators are used in the motion base 33.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A motion base for displacing a force measurement assembly, the motion base comprising:
   a base assembly;
   a support structure configured to be coupled to the force measurement assembly;
   a rotatable coupling device, the rotatable coupling device rotatably coupling the support structure to the base assembly; and
   an actuation system, the actuation system including one or more actuators operatively coupled to the support structure, the one or more actuators configured to displace the support structure relative to the base assembly;
   wherein the weight of the support structure is not entirely supported by the one or more actuators; and
   wherein greater than 50% of the weight of the support structure is supported by the rotatable coupling device.

2. The motion base according to claim 1, wherein the motion base has at least two degrees of freedom.

3. The motion base according to claim 1, wherein the rotatable coupling device has at least two degrees of freedom.

4. The motion base according to claim 3, wherein the rotatable coupling device comprises a gimbal component.

5. The motion base according to claim 1, wherein the one or more actuators of the actuation system comprise one or more linear actuators and the base assembly comprises a base component for supporting the motion base, the one or more linear actuators of the actuation system being connected between the base component and the support structure.

6. The motion base according to claim 5, wherein the one or more linear actuators of the actuation system comprise a plurality of linear actuators, each of the plurality of linear actuators connected between the base component and the support structure.

7. The motion base according to claim 5, wherein the base assembly further comprises a mounting frame for supporting the rotatable coupling device above the base component.

8. The motion base according to claim 7, further comprising one or more bearing assemblies for rotatably coupling the rotatable coupling device to the mounting frame of the base assembly.

9. The motion base according to claim 5, wherein an upper end of at least one of the one or more linear actuators of the actuation system is rotatably connected to the support structure by means of an upper joint member having at least two degrees of freedom.

10. The motion base according to claim 5, wherein a lower end of at least one of the one or more linear actuators of the actuation system is rotatably connected to the base component by means of a lower joint member having at least two degrees of freedom.

11. The motion base according to claim 1, wherein the force measurement assembly comprises one of: (i) an instrumented treadmill and (ii) a force plate.

12. A motion base for displacing an object above a support surface, the motion base comprising:
    a base assembly, the base assembly comprising a base component for supporting the motion base;
    a support structure configured to be coupled to the object;
    a rotatable coupling device, the rotatable coupling device rotatably coupling the support structure to the base component of the base assembly, the rotatable coupling device being disposed inwardly from a peripheral edge of the base component; and
    an actuation system, the actuation system including one or more actuators operatively coupled to the support structure, at least one of the one or more actuators being located closer to the peripheral edge of the base component than the rotatable coupling device, and the one or more actuators configured to displace the support structure relative to the base assembly;
    wherein greater than 50% of the weight of the support structure is supported by the rotatable coupling device.

13. The motion base according to claim 12, wherein the object that is coupled to the support structure comprises one of: (i) an instrumented treadmill, (ii) a force plate, (iii) a flight simulator, and (iv) a virtual reality simulator.

14. A motion base for displacing a force measurement assembly, the motion base comprising:
    a base assembly;
    a support structure configured to be coupled to the force measurement assembly;
    a rotatable coupling device, the rotatable coupling device rotatably coupling the support structure to the base assembly; and
    an actuation system, the actuation system including one or more actuators operatively coupled to the support structure, the one or more actuators configured to displace the support structure relative to the base assembly;
    wherein greater than 50% of the weight of the support structure is supported by the rotatable coupling device.

15. The motion base according to claim 14, wherein the rotatable coupling device has at least two degrees of freedom.

16. The motion base according to claim 14, wherein the one or more actuators of the actuation system comprise one or more linear actuators and the base assembly comprises a base component for supporting the motion base, the one or more linear actuators of the actuation system being connected between the base component and the support structure.

17. The motion base according to claim 16, wherein the one or more linear actuators of the actuation system comprise a plurality of linear actuators, each of the plurality of linear actuators connected between the base component and the support structure.

18. The motion base according to claim 16, wherein the base assembly further comprises a mounting frame for supporting the rotatable coupling device above the base component.

* * * * *